(12) United States Patent
Betsche et al.

(10) Patent No.: US 8,463,422 B2
(45) Date of Patent: Jun. 11, 2013

(54) APPARATUS AND METHOD FOR USER-SPECIFIC MONITORING AND CONTROL OF PRODUCTION

(75) Inventors: Markus Betsche, Rosenhiem (DE); Günther Grimm, Winterstrasse (DE); Arno Wyrwoll, München (DE)

(73) Assignee: KraussMaffei Technologies GmbH, München (DE)

( * ) Notice: Subject to any disclaimer, the term of this patent is extended or adjusted under 35 U.S.C. 154(b) by 695 days.

(21) Appl. No.: 12/307,462

(22) PCT Filed: Jun. 26, 2007

(86) PCT No.: PCT/EP2007/056382
§ 371 (c)(1),
(2), (4) Date: Dec. 3, 2009

(87) PCT Pub. No.: WO2008/003618
PCT Pub. Date: Jan. 10, 2008

(65) Prior Publication Data
US 2010/0065979 A1    Mar. 18, 2010

(30) Foreign Application Priority Data
Jul. 6, 2006 (DE) .......................... 10 2006 031 268

(51) Int. Cl.
*B29B 7/00* (2006.01)
*B29C 39/00* (2006.01)
*G06F 19/00* (2011.01)
*G06F 17/00* (2006.01)

(52) U.S. Cl.
USPC ........ 700/197; 264/328.7; 700/108; 700/109; 700/114; 700/117; 700/150; 700/159; 700/172; 700/174; 700/177; 700/204; 700/212; 700/231; 700/240; 700/244

(58) Field of Classification Search
USPC ........................................ 700/197; 264/328.7
See application file for complete search history.

(56) References Cited

U.S. PATENT DOCUMENTS 3,601,854 A * 8/1971 Trueblood ..................... 425/155
3,642,401 A * 2/1972 Wilson .......................... 425/137
(Continued)

FOREIGN PATENT DOCUMENTS

DE     43 40 415 A1    6/1994
DE     44 34 654 A1    4/1996
(Continued)

OTHER PUBLICATIONS

Betsche et al., "Multitialented Machine for Economical Injection Moulding",Feb. 2005, Kunststoffe, p. 54-58.*

*Primary Examiner* — Kavita Padmanabhan
*Assistant Examiner* — Thomas Stevens
(74) *Attorney, Agent, or Firm* — Henry M. Feiereisen LLC

(57) ABSTRACT

An extruder or injection molding machine with user-specifically monitoring and regulating processing of plastic materials includes a material feed, a plasticizer, and a mold. A process input variable, e.g. cost of the apparatus, raw material, power, and processed quantity, can be inputted with an input device and transmitted to a controller. A process monitoring variable, e.g. the duration of a product cycle, product cost, raw material used/power consumed per product cycle, expected purchase price for a given quantity of a product, and number of product cycles until maintenance, can be determined in real time from a process control variable and/or process input variable. A value of a process monitoring variable, such as the actual desired, or mean value, the value integrated since starting, the history or tendency of this value, can be outputted on an output device in form of a characteristic diagram.

29 Claims, 1 Drawing Sheet

U.S. PATENT DOCUMENTS

| | | | | |
|---|---|---|---|---|
| 4,314,954 A * | 2/1982 | Ringdal | ........................ | 264/45.5 |
| 4,427,353 A * | 1/1984 | Omiya et al. | ................. | 425/151 |
| 4,674,053 A * | 6/1987 | Bannai et al. | ................... | 700/197 |
| 4,690,629 A * | 9/1987 | Horikawa | .................... | 425/156 |
| 4,734,869 A * | 3/1988 | Mickowski | ................... | 702/183 |
| 4,927,044 A * | 5/1990 | Gotoh et al. | ................. | 220/660 |
| 4,954,305 A * | 9/1990 | Weihrauch | .................... | 264/157 |
| 5,031,108 A * | 7/1991 | Fujita et al. | ................... | 700/197 |
| 5,062,052 A * | 10/1991 | Sparer et al. | ................... | 700/197 |
| 5,063,008 A * | 11/1991 | Wenskus et al. | ............. | 264/40.5 |
| 5,095,419 A * | 3/1992 | Seki et al. | ........................ | 700/83 |
| 5,124,095 A * | 6/1992 | Gianni et al. | ................. | 264/45.5 |
| 5,238,380 A * | 8/1993 | Wenskus et al. | ............. | 425/145 |
| 5,398,839 A * | 3/1995 | Kleyn | ..................... | 220/560.03 |
| 5,470,218 A * | 11/1995 | Hillman et al. | ................ | 425/144 |
| 5,792,483 A * | 8/1998 | Siegrist et al. | ................ | 425/135 |
| 5,957,192 A * | 9/1999 | Kitamura et al. | .............. | 164/457 |
| 6,689,303 B2 * | 2/2004 | Seki et al. | ................... | 264/328.1 |
| 6,836,699 B2 * | 12/2004 | Lukis et al. | ................... | 700/200 |
| 6,911,166 B2 * | 6/2005 | Neal | ........................ | 264/40.5 |
| 7,132,069 B2 * | 11/2006 | Hakoda et al. | ............... | 264/40.1 |
| 7,318,960 B2 * | 1/2008 | Yamamoto et al. | ......... | 428/474.4 |
| 7,404,713 B2 * | 7/2008 | Goinski | ........................ | 425/563 |
| 7,815,838 B2 * | 10/2010 | Zimmet | ........................ | 264/328.1 |
| 7,824,597 B2 * | 11/2010 | Klotz | ........................ | 264/328.7 |
| 7,892,463 B2 * | 2/2011 | Kato et al. | ..................... | 264/40.5 |
| 2002/0014720 A1 * | 2/2002 | Sicilia et al. | ................... | 264/255 |
| 2002/0193912 A1 * | 12/2002 | Hamad et al. | ................. | 700/291 |
| 2003/0026869 A1 * | 2/2003 | Weber et al. | .................. | 425/557 |
| 2003/0065420 A1 * | 4/2003 | Kachnic et al. | .................. | 700/204 |
| 2003/0206820 A1 * | 11/2003 | Keicher et al. | ..................... | 419/9 |
| 2005/0027380 A1 | 2/2005 | Bellm et al. | | |
| 2005/0049723 A1 * | 3/2005 | Giannini | ........................ | 700/11 |
| 2005/0125092 A1 * | 6/2005 | Lukis et al. | ................... | 700/197 |
| 2005/0218545 A1 * | 10/2005 | Hakoda et al. | ............... | 264/40.5 |
| 2006/0113693 A1 * | 6/2006 | McBain et al. | ............... | 264/40.1 |
| 2007/0027563 A1 * | 2/2007 | Yamada et al. | ................. | 700/95 |

FOREIGN PATENT DOCUMENTS

| | | |
|---|---|---|
| DE | 199 29 821 A1 | 3/2000 |
| DE | 198 47 908 C1 | 4/2000 |
| DE | 102 05 016 A1 | 8/2003 |
| DE | 10 2004 041 891 | 4/2006 |

* cited by examiner

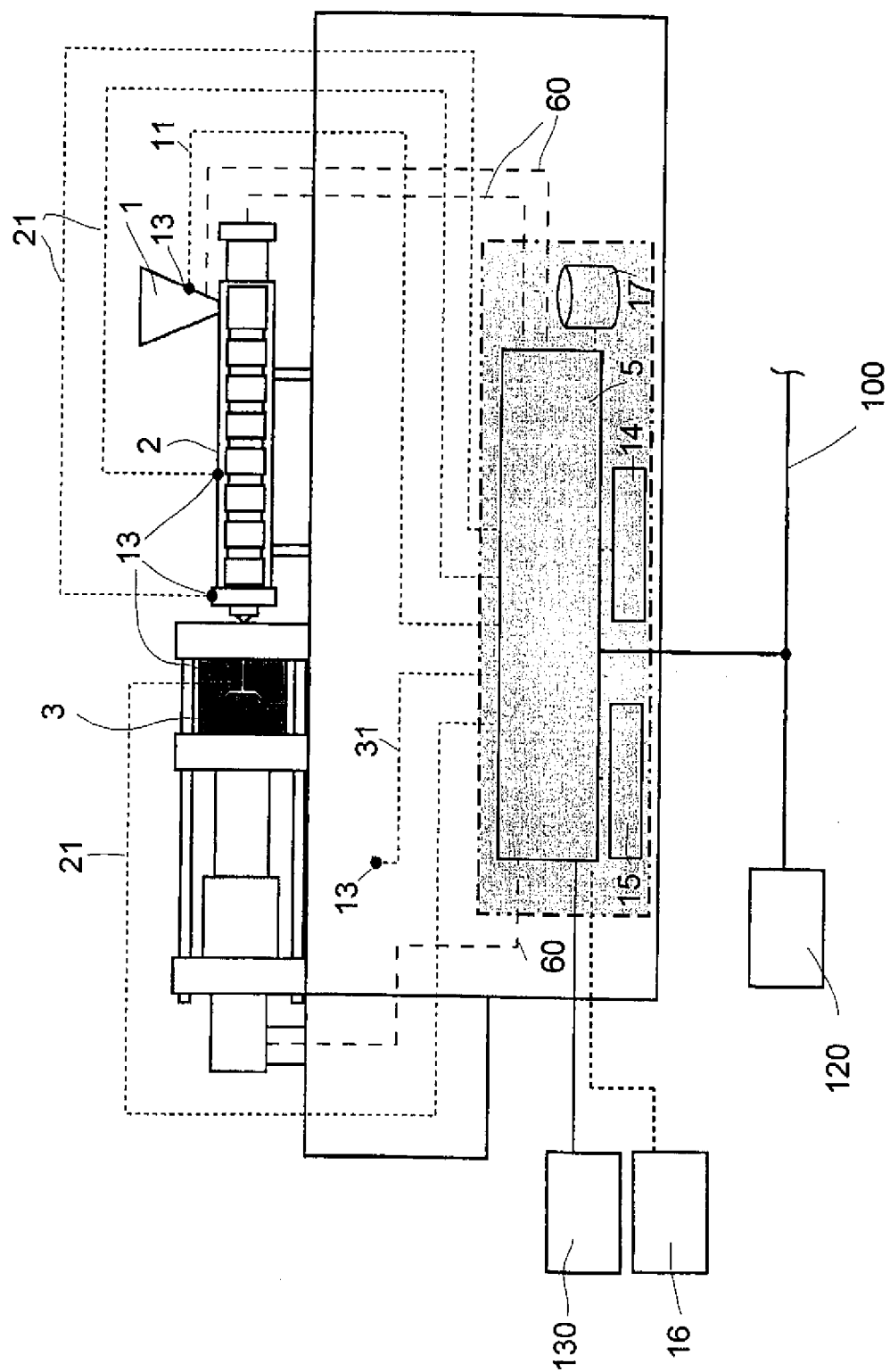

APPARATUS AND METHOD FOR USER-SPECIFIC MONITORING AND CONTROL OF PRODUCTION

BACKGROUND OF THE INVENTION

The present invention relates to an apparatus and a method for user-specific monitoring and control of production, in particular apparatuses and methods for processing plastics into specific products. For sake of simplicity, the invention will be described hereinafter with reference to apparatuses for processing plastic materials. However, this is not meant to limit the subject matter of the invention, which may include any type of production machines.

Apparatuses for processing plastic materials, in particular extruders or injection molding machines, form the aforementioned plastic products by employing a particular sequence of separate fabrication processes, which can be controlled with predetermined process parameters.

These products must in many cases satisfy ever increasing quality demands. On the other hand, large quantities are produced by a number of suppliers, so that the product offering is relatively large, the realized sale prices are comparatively small, so that the manufacturers are under steadily increasing pressure to reduce costs, in particular energy costs. This requires an accurate control of the quality and productivity as well as cost-related items, such as the energy usage for the production.

When employing conventional apparatuses, frequently only the average costs can be determined for a particular product, and only the approximate production costs for a certain production lot, which are based on a number of averaged and experience values, such as energy and service costs of the machine. These values may also be available only after the production, because not all relevant parameters are available beforehand.

Conventional apparatuses have another disadvantage in that fixed time intervals based on experience must be set to service them. These apparatuses are therefore typically serviced too early, which causes unnecessary downtimes and costs.

On the other hand, service may already be required within such normally sufficient, fixed service interval because of increased wear. In this situation, damage to the apparatus and, more particularly, to the employed injection molding tools is frequently recognized too late. This also causes additional expenses in form of repair costs and again downtimes.

SUMMARY OF THE INVENTION

It is therefore an object of the present invention to provide an apparatus and a method for processing plastic materials, which obviates the disadvantages of the state-of-the-art and, more particularly, facilitates user-specific monitoring and control of the fabrication. Preferably, one goal is here an increase in the efficiency, in particular with respect to the energy consumed to produce a predetermined quantity of a predefined product, and a reduction in the expenses related to maintenance and repair.

According to one aspect of the invention, the object is attained by an apparatus, in particular extrusion or injection molding machine, for user-specific monitoring of processing of plastic materials in a predetermined sequence of individual fabrication processes which can be controlled by predetermined process parameters, with at least one material supply device, which supplies the plastic material to be processed as raw material in at least one fabrication process, at least one plasticizing device which plasticizes and/or homogenizes the supplied raw material in at least one additional fabrication process, at least one molding device, in particular an injection molding tool, which forms the plasticized and/or homogenized raw material in at least one additional fabrication process into a product that is removed from the molding device after a predetermined cool-down and/or hardening time, wherein—for a predetermined production startup time of the apparatus—the sequential order of the fabrication processes between supply of the raw material and removal of the product defines a product cycle, at least one control device which controls the fabrication via at least one process control quantity—in particular via at least one of the process parameters—which can be connected for data transmission with at least one input device which is used to input at least one value of a fabrication input quantity, such as in particular the costs of the apparatus, the raw material, the energy, the molding devices, the depreciation, the interest and/or the personnel, fabrication quantity and to preset preferably at least one desired value of at least one process control quantity, at least one processor which can be connected for data transmission with the control device and which can be used to determine essentially in real time from at least one predetermined process control quantity and/or at least one predetermined fabrication input quantity at least one predetermined process monitoring quantity, such as in particular product cycle duration, product costs, product quality, raw material and/or energy usage per product cycle, expected raw material requirements, expected production duration and/or expected production costs for a predetermined quantity of a predetermined product, product error probability, product error rate, the number of product cycles until service is required, calibration and/or an exchange of parts of the apparatus, in particular of the molding device, service and repair costs, production startup time and/or costs, wherein the control device (5) can be connected for data transmission with at least one output device (16), which can be used to output and preferably display in form of a characteristic curve field at least one value of at least one process monitoring quantity, in particular the actual, desired, average value, the integrated value since startup of the apparatus and/or its history, and/or the trend.

According to another aspect of the present invention, the object is attained by an apparatus for user-specific closed-loop control of the processing of plastic materials, wherein at least one process monitoring quantity is controlled as process regulating quantity, wherein the control device can be connected for data transmission with at least one closed-loop controller, which regulates at least one process regulating quantity according to at least one presettable—preferably via the input device—control criterion or to at least one presettable desired value.

According to another aspect of the present invention, the object is attained by a method, in particular an extrusion or injection molding process, for user-specific monitoring of processing of plastic materials in a predetermined sequence of individual fabrication processes which can be controlled via predetermined process parameters, with at least one material supply step which, as at least one fabrication process, supplies the plastic material to be processed as raw material, at least one plasticizing step which, as at least one additional fabrication process, plasticizes and/or homogenizes the supplied raw material, at least one molding step which forms the plasticized and/or homogenized raw material into a product that can be removed after a predetermined cool-down and/or hardening time, wherein—following a production startup step—the sequence of the fabrication processes between supply of the raw material and removal of the product defines a product cycle, at least one control step which controls processing via at least one process control quantity—in particular via at least one of the process parameters, at least one input step, in which at least one value of a process input quantity, in particular the costs of the process, raw material, energy, the molding step, depreciation, interest and/or personnel, process quantity can be inputted, and preferably at least one desired value of at least one process control quantity can be preset, at least one processing step, in which at least one predetermined process monitoring quantity can be determined essentially in real time from at least one predetermined process control quantity and/or at least one predetermined process input quantity, wherein the at least one predetermined process monitoring quantity includes, in particular, the product cycle duration, the product costs, the product quality, the raw material and/or energy usage per product cycle, the expected raw material requirements, the expected production duration and/or the expected production costs for the predetermined quantity of a predetermined product, the product error probability, the product error rate, the number of product cycles until service is required, calibration and/or in exchange of parts of the apparatus, in particular of the mold, the maintenance and repair costs and/or the production startup time and/or costs, and at least one output step, in which at least one value of at least one process monitoring quantity, in particular the actual value, desired value, average value, the integrated value since the start of the processor and/or its history, and/or the trend can be outputted, and preferably displayed by way of a characteristic curve field.

The apparatus of the invention is configured at least for user-specific monitoring of processing of plastic materials in a predetermined sequence of individual fabrication processes which can be controlled by predetermined process parameters. According to the invention, the apparatus includes at least one material supply device, which in at least one fabrication process supplies the plastic material to be processed as raw material. In addition, at least one plasticizing device is provided which plasticizes and/or homogenizes the supplied raw material in at least one additional fabrication process.

According to the present invention, the apparatus also includes at least one molding device, in particular an injection molding tool, which forms the plasticized and/or homogenized raw material into a product in at least one additional fabrication process. This product is removed from the molding tool after a predetermined cool-down and/or hardening time. The described sequence of the fabrication processes between supply of the raw material and removal of the product defines—after a predetermined production startup time of the apparatus—a product cycle.

According to the invention, the apparatus includes at least one control device which controls the processing via at least one process control quantity—in particular via at least one of the process parameters. The control device can be connected with at least one input device for data transmission.

Within the context of the present invention, the term "connectable for data transmission" is to be understood that at least two devices are connected via a link for transmitting data. This data link can be wired or wireless. Preferably, the data link is implemented using data links employing conventional standards, such as I²C, RS-232, LAN for wired, or WLAN, Bluetooth for wireless data links. However, optical data links using glass fiber or free space infrared links can be employed.

The input device can be used to input at least one value of a processing input quantity, in particular the cost of the apparatus, of the raw material, the energy, the mold tools, depreciation, the cost for interest and/or personnel, processed quantity. Preferably, at least one desired value of at least one process control quantity can be preset via the input device.

In certain embodiments, the input device is not part of the apparatus of the invention. However, in such embodiments, the apparatus includes at least one data interface, via which the process input quantities, such as variations of the raw material costs and other conditions, can be inputted from an external input device, for example, via a central computer. Peripheral devices can also be used as input devices, from which process input quantities in form of data can also be integrated.

According to the invention, in addition at least one processor can be connected with the control device for data transmission. The processor can be used to determine essentially in real time from at least one predetermined process control quantity and/or at least one predetermined process input quantity at least one predetermined process monitoring quantity.

Typical process monitoring quantities of interest for the operator of the apparatus are, for example, product cycle time, product costs, product quality, raw material and/or energy usage per product cycle, and also—related thereto—the expected raw material requirement, the expected production duration and/or the expected production costs for a predetermined quantity of the predetermined product, the product error probability, the product error rate, the number of product cycles until service is required, calibration and/or an exchange of parts of the apparatus, in particular of the mold, the maintenance and repair costs and/or the production startup time and/or costs.

According to the present invention, the control device can be connected with at least one output device for data transmission. The output device of the invention can be used to output at least one value of at least one process monitoring quantity, in particular the actual, desired, average value, the integrated value since startup of the apparatus, its history and/or trend. Preferably, at least one of the values can be displayed in form of a curve field.

Preferably, the actual values of apparatus-related process monitoring quantities, such as product cycle duration, rejection rate (tolerance monitoring), downtimes, energy usage, water and air usage can be directly represented by way of the output device, and the resulting usage rates can be estimated therefrom and documented.

Preferably, with the apparatus, for each production lot the desired situation of predetermined process monitoring quantities can be compared with the actual situation, and their history and the tend based on the history can preferably be displayed in addition to the actual values.

The apparatus of the invention provides for the operator the advantage that he does not need to painstakingly evaluate the production success from individual tolerances, but instead allows a comprehensive and direct evaluation of certain precisely determinable production targets by plausibly combining diverse functionalities of the apparatus. These can be evaluated with conventional apparatuses only at a later time, if at all, and can hence no longer be taken into consideration in the optimization process, which is also a subject of the invention.

In preferred embodiments, the output device allows displaying the calculation of the production cost by linking essentially in real time, in particular the process input quantities, which impact the costs, with frequently complex process monitoring quantities. Preferably, the production cost calculation is displayed on a display screen with a touch functionality for controlling the apparatus, i.e., the input and output device can be combined.

Preferably, the apparatus of the invention is an extrusion machine or an injection molding machine.

According to a preferred modification, the apparatus of the invention is also configured for user-specific control of the processing of plastic materials. To this end, at least one process monitoring quantity is controlled as process regulating quantity, in that the control device can be connected for data transmission with at least one open-loop control device, which regulates at least one process regulating quantity according to at least one control criterion which can be predetermined—preferably via the input device—or to at least one predefinable desired value.

In a preferred modification of the apparatus of the invention, the at least one control criterion is selected from a group consisting of at least a minimum production cycle time, i.e., a largest product output rate, minimum energy usage per product cycle, minimum production costs, minimum production cost for a predetermined quantity of a predetermined product, maximum product quality, maximum number of product cycles until service is required, calibration and/or exchange of parts of the apparatus, minimum maintenance and repair costs and/or minimum production startup time and/or cost.

In a preferred embodiment of the apparatus of the invention, the processor can be connected for data transmission with at least one storage device, in which at least a lower and/or an upper—preferably product-related—experience limit value is stored for at least one process monitoring and/or control quantity.

According to another preferred embodiment of the apparatus of the invention, the processor, when regulating at least one process control quantity, monitors at least one process monitoring quantity such that its actual value does not fall below the at least one lower experience limit value and/or at least one presettable—preferably via the input device—lower, preferably product-related, user limit value, or does not exceed the at least one upper experience limit value and/or at least one presettable—preferably via the input device—upper, preferably product-related, user limit value.

In a preferred modification of the apparatus of the invention, the control device outputs a corresponding warning signal and/or a warning message via the output device and/or controls the apparatus to a safe condition or switches the apparatus off, when the actual value of the at least one process monitoring quantity exceeds or fall below at least one experience and/or user limit value—in particular if the actual value falls outside the limit value(s) substantially permanently over a predeterminable number of the product cycles.

In a preferred embodiment of the apparatus of the invention, the control device can be connected for data transmission with at least one measurement device, which measures under the control of the control device continuously or at certain times during at least one predetermined fabrication process within at least one predetermined product cycle at least one predetermined process measurement quantity. Preferably, the process measurement quantity is selected from the group consisting at least of faults, downtimes, in particular installation and maintenance times, and/or power usage of the apparatus, temperature, wear, downtimes and/or faults of the molding device, temperature and/or usage of coolant for cooling down the product, duration of at least one of the fabrication processes, ambient temperature, viscosity of the oil used for at least one hydraulic device and the like.

In another preferred embodiment of the apparatus of the invention, the processor can determine from the at least one process measurement quantity at least one actual value of at least one predetermined process control, monitoring and/or regulating quantity, in particular the product cycle time and/or the energy usage per product cycle. Preferably, the deviation of the corresponding actual value from the respective desired value can also be determined.

In a preferred modification of the apparatus of the invention, at least a dependence of at least one process monitoring or regulating quantity from at least one process control quantity and/or from another process monitoring or regulating quantity is stored in the storage device as at least one characteristic function in form of a predetermined number of discrete—preferably product-related—experience value tuples.

In a preferred embodiment of the apparatus of the invention, the apparatus can be operated in at least one—preferably product-related—learning mode. In this learning mode, at least one other process measurement quantity is measured with the at least one measurement device in predetermined steps, and optionally in predetermined fixed values of at least one other process control quantity, in at least one measurement series where the desired value of at least one predetermined process control quantity of the at least one product cycle automatically changes. The processor determines from this at least one predetermined process measurement quantity the at least one resulting actual value of at least one predetermined process regulating and/or monitoring quantity, and thereby at least one characteristic function. This characteristic function is stored in the storage device in form of a predetermined number of discrete—preferably product-related—tuples of measurement values.

A simple learning mode can be configured such that the apparatus goes through different product cycles within certain reasonable value ranges with the goal of producing a high-quality product using process parameters, which are typically varied for optimizing the products. For the different process parameters of these product cycles, the corresponding energy usage of the individual devices is measured by suitable measurement devices, evaluated in the processor and stored in the storage device. The result is a characteristic function showing (total) energy usage per product cycle as a function of the varied process parameters. The process parameters for the most energy-efficient product cycle can then be derived from this characteristic function.

In addition, the energetically optimum product cycle can be adjusted by suitable process parameter selection based on the energy usage/product cycle characteristic function by taking into consideration the respective duration of the individual fabrication processes.

According to a preferred embodiment, if the energetically optimum product cycle cannot be attained by the corresponding process parameter selection, the operator is requested by the output device to change the process parameters or optionally service the apparatus or the molding tool. This production-dependent maintenance is advantageous because it increases the average uptimes of the apparatus, because the repair intervals are set by the process parameters based on the actual need and not on inflexible experience values.

In another preferred embodiment of the apparatus of the invention, the processor determines based on the at least one measurement series for the at least one process input quantity at least one limit value—which can preferably be outputted via the output device—, for which at least one process monitoring quantity, in particular the product cost, does not exceed or fall below at least one predetermined monitoring limit value while regulating at least one other process regulating quantity commensurate with the at least one control criterion or to the at least one predetermined desired value.

In a preferred modification of the apparatus of the invention, the process determines based on the at least one actual value and/or the history at least one process measurement, monitoring and/or control quantity, and based on at least one experience and/or user limit value for this quantity, such as in particular the maximum viscosity of the oil used in the at least one hydraulic device, the maximum energy usage per production cycle, at least one limit value—which can preferably be outputted via the output device—for the maximum number of additional product cycles, before maintenance, calibration and/or exchange of parts of the apparatus, in particular of the molding device, becomes necessary. The associated costs can then be minimized by basing the maintenance and repair activities on the actual need. The maintenance measures for apparatus of the invention are then more targeted and increase the uptime.

Preferably, the apparatus makes it possible to evaluate and monitor the actual value of the wear and/or the progression of the wear of specific parts based on the at least one actual value and/or the history of at least one process measurement, monitoring and/or control quantity. For example, if energy usage increases during the production time for the same injection molding tool and the same product cycle duration, then this indicates that the apparatus requires maintenance or inspection.

Preferably, in this situation, additional process measurement, monitoring and/or regulating quantities, which can indicate wear, are evaluated by the processor with respect to the user limit values or experience limit values. The apparatus can then automatically differentiate if an oil change is required in a hydraulically driven apparatus or if the injection molding tool needs to be serviced.

Such wear condition quantities include, in particular, process measurement, monitoring and/or regulating quantities of control valves, pumps and the like. The apparatus is hereby particularly adapted to provide long-time monitoring of the aforementioned quantities during the life cycle of the apparatus. If the processor determines a certain deviation of one of these quantities from a predetermined tolerance field, then the user is informed by the output device that the corresponding wear part, e.g., a valve or the like, must be calibrated or exchanged.

The operator of the apparatus is also informed via the output device, which quantities are not inside the tolerance field, meaning that the operator can therefore himself diagnose the state of the apparatus and optionally calibrate or exchange parts. A calibration of the apparatus by the service of the apparatus manufacturer then becomes unnecessary. The operator calibrates the apparatus himself if needed, which again results in cost savings.

In a preferred embodiment of the apparatus of the invention, a process regulating quantity is controlled in that the processor evaluates, based on at least one characteristic function of this process regulating quantity, its dependence on at least one process control quantity, wherein at least one measurement or experience value of at least one process control quantity is determined, for which the corresponding characteristic function value according to the respective control criterion is a minimum, a maximum or has the smallest absolute difference value to the predetermined desired value.

In another preferred embodiment of the apparatus of the invention, at least one process monitoring quantity is monitored regulating at least one process regulating quantity, so that the processor evaluates, based on at least one characteristic function of the process control quantity, its dependence from at least one process control quantity and from the process monitoring quantity, wherein at least one optimum value is determined among the measurement or experience values of the at least one process control quantity, for which the respective characteristic function value according to the respective control criterion is a minimum, a maximum or has the smallest absolute difference to the predetermined desired value, while at least one measurement or experience value of the process monitoring quantity associated with the optimum value—preferably product-related—does not fall below or exceed a lower and/or upper experience limit value and/or user limit value, respectively.

In a preferred modification of the apparatus of the invention, the at least one process regulating quantity is regulated automatically, wherein the control device sets at least one desired value of at least one process control quantity to at least one optimum value of at least the process control quantity, as determined from the at least one corresponding characteristic function.

In another preferred embodiment of the apparatus of the invention, a process control quantity is regulated manually, wherein the at least one optimum value of the at least one process control quantity determined from the at least one corresponding characteristic function is outputted on the output device, allowing the user to change the at least one desired value of the at least one corresponding process control quantity accordingly via the input device. This semi-automatic operating mode has the advantage that—in particular when starting the production of new product types—the operator has initially the option to intervene in the control of the injection molding machine, or only assistance for optimizing the process regulating quantities may be desired.

In another preferred embodiment of the apparatus of the invention, the apparatus can be operated in at least one—preferably product-related—mode for maximizing the output rate, in which the product cycle duration representing the process control quantity is regulated to its minimum value and the product quality is monitored as process monitoring quantity so as not to fall below at least the—preferably product-related—lower experience or user limit value.

In a preferred modification of the apparatus of the invention, the apparatus can be operated in at least one—preferably product-related—mode to minimize product costs, wherein the product costs are regulated as process regulating quantity to its minimum value, and the product quality is monitored as process monitoring quantity so as not to fall below at least the—preferably product-related—lower experience or user limit value.

In another preferred embodiment of the apparatus of the invention, the apparatus can be operated in at least one—preferably product-related—mode to minimize energy usage per product cycle, wherein the energy usage product cycle is regulated as process regulating quantity to its minimum value, and the product quality is monitored as process monitoring quantity so as not to fall below at least the—preferably product-related—lower experience or user limit value.

In another preferred embodiment of the apparatus of the invention, at least two process monitoring quantities are regulated as process regulating quantities according at least one predetermined combination of the aforementioned or similar control criteria. Preferably, the processor determines—preferably from the at least one characteristic function or in the at least one learning mode—at least one optimum value of at least one process control quantity for the optimum product cycle, for which product cycle duration, material and energy usage per product cycle are simultaneously a minimum.

In a preferred modification of the apparatus of the invention, the control device can be connected with at least one data network, in particular an intranet or the Internet, and the control device provides in the data network at least one data service, which is selected from a group consisting of Web and/or XML server services, FTP server services, SQL server services, e-mail services, application server services, in particular J2EE services, file server services, in particular WebDAV, SMB, NFS or AFP server services and the like, and/or the control device operates as a terminal (client) for the at least one data service.

In a preferred embodiment of the apparatus of the invention, the control device provides essentially in real time by way of at least one of the data services in the at least one data network at least one process control, measurement, monitoring and/or control quantity, such as in particular the product cycle duration, the product costs, the product quality, the raw material and/or energy usage per product cycle, the expected raw material requirements, the expected production duration and/or the expected production costs for the predetermined quantity of a predetermined product, the product error probability, the product error rate, the number of product cycles until service is required, calibration and/or in exchange of parts of the apparatus, in particular of the mold, maintenance and repair costs and/or production startup time and/or costs.

The method of the invention, in particular an extrusion or injection molding process, for user-specific monitoring of processing of plastic materials in a predetermined sequence of individual fabrication processes which can be controlled via predetermined process parameters, includes at least the following steps:

In at least one material supply step representing at least one fabrication process, the plastic material to be processed is supplied as raw material. In addition, at least one plasticizing step is provided as at least one additional fabrication process, in which supplied raw material is plasticized and/or homogenized. In at least one molding step representing at least one additional fabrication process, the plasticized and/or homogenized raw material is formed into a product, which can be removed after a predetermined cooling and/or hardening time. The sequence of the fabrication processes between supply of the raw material and removal of the product—following a production startup step—defines a product cycle.

In at least one additional control step according to the invention, processing is controlled by at least one process control quantity—in particular by at least one of the process parameters.

According to the invention, at least one input step is provided, in which at least one value of a process input quantity, in particular the costs for the apparatus, the raw material, energy, the molding devices, depreciation, interest and/or personnel, and process quantity, are inputted, and preferably at least one desired value of at least one process control quantity can be preset.

In at least one processing step, at least one predetermined process monitoring quantity can be determined essentially in real time from at least one predetermined process control quantity and/or at least one predetermined process input quantity, such as the product cycle duration, the product costs, the product quality, the raw material and/or energy usage per product cycle, the expected raw material requirements, the expected production duration and/or the expected production costs for the predetermined quantity of a predetermined product, the product error probability, the product error rate, the number of product cycles until service is required, calibration and/or in exchange of parts of the apparatus, in particular of the mold, the maintenance and repair costs and/or the production startup time and/or costs.

In addition, in at least one output step, at least one value of at least one process monitoring quantity, in particular the actual value, desired value, average value, the integrated value since the start of the process and/or its history, and/or the trend can be outputted and preferably displayed by way of a characteristic curve field.

According to a preferred modification, the method of the invention includes also at least one step for user-specific closed-loop control of processing of plastic materials. In this step, at least one process monitoring quantity is controlled as process regulating quantity according to at least one presettable—preferably in the input step—control criterion or according to a predeterminable desired value.

Preferred embodiments of the apparatus of the invention have the advantage that not only average experience values are taken into account for controlling the production process and during service. Unlike conventional apparatuses, the production quality and production quantity is not simply controlled via the corresponding process control quantities, but instead by actively controlling frequently more complex process regulation quantities, such as energy usage for a predetermined quantity of a product.

In this way, the user friendliness of the apparatus of the invention is enhanced over conventional apparatuses, i.e., the operator of the apparatus is not forced to find laboriously averaged experience values for the process control quantities, i.e., especially the process parameters of the individual fabrication processes, for which the processing and/or the products meet certain target criteria. Instead, such control criteria, such as minimum energy usage for a predetermined quantity of a predetermined product, can be easily and directly defined via the input device and/or optionally quantified. Preferred embodiments of the apparatus of the invention then enable an automatic operation which is more cost-effective and/or more energy efficient.

Preferred embodiments of the apparatus of the invention also advantageous because the energy usage is not merely passively and approximately controlled via process control quantities, i.e., typically via the process parameters. Instead, the exact value of the energy usage can be can be computed in the processor with suitable computing algorithms by measuring the actual values of the process measurement quantities that affect the energy usage, such as rated power of the apparatus, ambient temperature, temperature of the raw material, of the mold tool, the cooling water and the demolded product. The deviation from the desired value can also be determined and the resulting error value can be readily minimized by the control device.

This is accomplished preferably based on the dependency of the process regulating quantities determined in the measurement series from the process control quantities which are stored as characteristic functions in the storage device. I.e., the apparatus can determine with the processor from the characteristic functions, which process control quantities, in particular which process parameter, needs to be changed in which way, so as to possibly eliminate the error in the control device.

Advantageously, such active control can also automatically take into account that typically different process control quantities need to be set for different product forms, i.e., for product formed by different mold tools, to minimize the energy usage.

With preferred embodiments of the apparatus according to the present invention, relationships between process monitoring and/or regulating quantities, such as product cycle duration and energy usage per product cycle duration can be advantageously be taken into consideration also in the closed-loop control. By considering such relationships, a large number of process input and process control quantities can be introduced into the control process and optimization of the fabrication process for different product forms. Stated differently, the apparatus advantageously makes it possible to determine those process control quantities for a product form, for which the process regulating quantity, for example energy usage per product cycle, are optimal according to the predetermined control criterion, for which, however, the actual value of a predetermined process monitoring quantity, for example the product quality, also exceeds a predetermined lower user limit value.

It should be noted that not all advantages must be realized in all embodiments of the apparatus of the invention.

Additional advantages and embodiments of the present invention are disclosed in the description of preferred exemplary embodiments and the appended drawing.

BRIEF DESCRIPTION OF THE DRAWING

The only FIGURE shows a schematic diagram of an apparatus of the invention for processing plastic materials.

DETAILED DESCRIPTION OF PREFERRED EMBODIMENTS

To simplify the discussion, an apparatus of the invention will now be described with reference an exemplary injection molding machine. However, this should not be interpreted that the subject matter of the invention is limited thereto. Instead, the described features and functions can also be applied in an analogous manner to extrusion machines or other plastic-processing machines.

The FIGURE shows—as already indicated—an injection molding machine as an embodiment of the apparatus of the invention, which includes a material supply device 1 supplying the raw material to be processed to a plasticizing unit 2. The injection molding machine according to the invention further includes a molding device 3 in form of an injection mold. The material that was plasticized and/or homogenized by the plasticizing unit is injected under pressure while the mold is closed, and demolded as molded product after a predetermined cool-down or hardening time by opening the injection mold.

The injection molding machine further includes a control device 5 which controls processing of the raw material to be processed via the process control quantities—in particular via the process parameters, such as the raw material quantity, injection pressure of the plasticized and/or homogenized raw material, the clamping force of the injection molding tool and the like. The control device 5 is hereby connected via control lines 60 with the plasticizing unit 2, the material supply device 1 and the molding device 3. The control lines 60 transmit the control commands of the control device 5 to the controlled sections of the aforementioned devices, in particular the device for opening and closing the injection mold.

The input device 130, which is assumed to be a standardized PC keyboard, can also be connected with the control device 5. However, solutions can also be contemplated wherein the input device 130 and the output device 16 can be combined in a display screen with touch-screen functionality.

The input device 130 can be used for inputting the values of the fabrication input quantities relevant for monitoring and regulating the injection molding machine. Such quantities are, in particular, the costs of the raw material, energy, the injection molding tools and the processing quantity or product quantity, i.e., the number of the product formed in a production cycle. The input device 130 is also used to input the desired values of the process control quantities, for example the injection speed or the injection pressure.

A processor 14 can be connected with the control device 5 for data transmission. The processor 14 can be used to determine continuously, i.e., also when process control quantities and/or process input quantity change, a process monitoring quantity, namely in this exemplary embodiment among others the cost of each individual product and the production costs of a predetermined product quantity based on predetermined process control quantities, for example the injection pressure and the predetermined process input quantities, such as energy, raw material, personnel and investment cost for the injection molding machine.

According to the exemplary embodiment illustrated in the FIGURE, the control device 5 can be connected for data transmission with the output device 16. The output device 16 is used for outputting the values of the process monitoring quantities, in particular the actual, desired, average value, the integrated value since the startup of the apparatus, its history and the trend. It is also feasible to display one of the values via a characteristic curve field.

The control device 5 of the injection molding machine according to the FIGURE is also connected with a data network 100, which is connected with a data service terminal 120. The control device 5 can also be connected via the data network 100 with control devices of additional plastic processing machines or via a corresponding interface with a remote network (Wide Area Network—WAN) or with the Internet.

The injection molding machine illustrated in the FIGURE as an embodiment of the apparatus of the invention is also configured for user-specific process control. In other words, a process monitoring quantity, in this example the production costs for a predetermined product quantity, is controlled as a process regulating quantity. To this end, the control device 5 can also be connected for data transmission with the closed-loop control device 15. The control device 15 can then also be connected for data transmission via the control device 5 with the input device 130, by which the control criterion, in the exemplary embodiment according to the FIGURE the minimum production costs, can be preset.

Through the control device 5, the control device 15 has available the actual values of the production costs for the predetermined product quantity as determined in the processor 14. To this end, suitable computation algorithms are stored in the processor 14 which can be updated when the configuration of the injection molding machine changes, and which relates the process input quantities, in the exemplary embodiment in particular energy, raw material, personnel and investment costs for the injection molding machine to the process measurement quantities measured with suitable measurement devices 13, such as the rated power of the injection molding machine, the temperature of the mold tool, or from other process measurement quantities, such as process monitoring quantities derived from the raw material inventory, e.g., the raw material usage for the predetermined product quantity.

The injection molding machine according to the exemplary embodiment in the FIGURE includes a first measurement device 13, which is arranged on the material supply device 1 and which measures as a process measurement quantity the raw material inventory. The actual value of the raw material inventory is transmitted via the data link 11 to the control device 5 and from there forwarded to the processor 14. The derivable process monitoring quantities, such as raw material usage for the predetermined product quantity, raw material usage per product cycle and/or in general the change of the raw material inventory, can be readily determined from the process measurement quantity raw material inventory, in particular as a function of time.

The injection molding machine depicted in the FIGURE also includes second measurement devices 13 on the plasticizing device 2 and on its nozzle as well as on the mold 3 as the injection molding tool, which measure process measurement quantities related to the plasticized and/or homogenized raw material and the material residing in the injection molding tool after injection. Preferably, these are measurement quantities of the state of the plasticized and/or homogenized raw material as well as of the injected material, for example its temperature, viscosity, homogeneity, pressure and the like. The actual values of the aforementioned process measurement quantities are transmitted via the data links 21 to the control device 5 and from there forwarded to the processor 14.

In the illustrated exemplary embodiment, the injection molding machine further includes third measurement devices 13 in the injection molding machine itself, which are used to measure process measurement quantities such as the instantaneous power usage, the provided cooling power and similar operating state quantities of the injection molding machine. The actual values of the aforementioned process measurement quantities are transmitted via the data link 31 to the control device 5 and from there to the processor 14.

In addition to the actual values of the production cost for the predetermined product quantity, the control device 15 has also available—via the input device 130 and transmitted by the control device 5—the desired value for the production costs in form of a control criterion, namely preferably the control to minimize production costs, or in form of an upper user limit value for the production costs which is not to be exceeded.

The final value for the production cost can be forecast from the history and the trend of the actual value of the production costs. The deviation between the forecast final value and the desired value or the minimum value resulting under optimum process control quantities represents the error quantity which can be minimized by the control device 15. This is preferably accomplished based on the dependence of the production costs determined in measurement series, which represents the process regulating quantity, from the process control quantities stored as the characteristic functions in the storage device 17. The processor 14 determines from the characteristic functions which process control quantity, in particular which process parameter, is to be changed in which way, so as to minimize or possibly eliminate the error quantity of the control system.

Initially, such characteristic function is stored in the storage device 17 preferably in form of experience values. However, the injection molding machine is operated, preferably automatically, in a learning mode adapted to events requiring updates of the characteristic functions in a suitable intervals so as to take into consideration that the process control quantities, for which the process regulating quantity assumes its optimum value for different product forms, are different and change in the ongoing production process when the process input quantities change, e.g., due to reconfigurations of the injection molding machine, wear of the injection molding tool, etc.

In the learning mode, the cooling power required for time the cool-down before the start of a new product cycle is measured with a measurement device 13 (not shown in the FIGURE) while the desired value of a predetermined process control quantity automatically changes in predetermined steps, for example the target temperature for cooling down the product, so that the product can be demolded after a product cycle without introducing additional plastic deformation, while values of the other process control quantities remain essentially constant.

The processor 14 determines from this process measurement quantity, in particular the actual value of the process input quantity "cooling energy costs", for a predetermined quantity of a predetermined product the final value of the production costs as forecast with the actual value of the cooling power.

The desired product cycle duration, or stated differently the desired product output rate, which as process monitoring quantity should at least exceed a lower limit value, essentially already requires a minimum cooling power. This can simultaneously be also the optimum value yielding the lowest production costs.

However, a higher cooling power may have the benefit that other process monitoring quantities, for example less tool wear, lower the production costs. The learning mode in the described measurement series then allows to determine the production costs as a function of the cooling power and, more particularly, to determine an optimal cooling power, which may be higher than the minimum defined by the product cycle duration, while still minimizing the production costs. The characteristic function is stored in the storage device 17 in form of a predetermined number of discrete measurement tuples, in the described example (cooling power, production costs).

What is claimed is:

1. A device for processing a plastic material, comprising:
   a material supply device which supplies the plastic material as raw material;
   a plasticizing device which plasticizes or homogenizes, or both, the supplied raw material;
   a molding device which forms the plasticized or homogenized raw material into a product that is removed from the molding device after a predetermined cool-down or hardening time,
   a control device which controls processing via process parameters and which is connected for data transmission with an input device receiving a value of a process input quantity or a process control quantity, or both,
   a processor which is connected for data transmission with the control device and determines, from a predetermined process control quantity or a predetermined process input quantity selected from an actual value or a history of at least one of a process measurement, monitoring and control quantity, and an experience or user limit value for this quantity, a process monitoring quantity representing at least one limit value for a maximum number of additional process cycles, before service is required, so as to thereby minimize service and repair costs by relying on a corresponding actual need, and
   an output device connected to the control device outputting and displaying in form of a characteristic curve field a value of the process monitoring quantity.

2. The device of claim 1, further comprising a closed-loop controller connected for data transmission with the control device, with the closed-loop controller regulating a process regulating quantity according to a presettable control criterion or a desired value received from the input device.

3. The device of claim 1, further comprising a storage device connected to the processor and storing at least one lower or upper experience limit value for a process monitoring quantity, or a process regulating quantity.

4. The device of claim 2, wherein the processor regulates the process regulating quantity such that an actual values of the process monitoring quantity does not fall below or does not exceed the at least one lower or upper experience limit value or a presettable lower and/or upper user limit value.

5. The device of claim 4, wherein if the actual value of the process monitoring quantity exceeds or falls below the experience or user limit value, the control device generates a warning signal or a warning message via the output device or controls the device to assume a safe state or switches the device off, or a combination thereof.

6. The device of claim 1, further comprising a measurement device connected for data transmission with the control device, which measures a predetermined process measurement quantity continuously or at predetermined points in time, wherein the process measurement quantity is selected from a group consisting of errors, downtimes, setup and maintenance times, power usage of the device, temperature, wear, downtimes, faults of the molding device, temperature, usage of a coolant employed for cooling down the product, duration of a fabrication processes, ambient temperature, and viscosity of oil used for a hydraulic device of the device.

7. The device of claim 6, wherein the processor determines from the process measurement quantity an actual value of at least one of a predetermined process control, monitoring and regulating quantity, or a deviation between the actual value and a corresponding desired value.

8. The device of claim 1, wherein the control device sets a desired value of a process control quantity, which is regulated automatically, to an optimum value determined from a corresponding characteristic function.

9. The device of claim 1, wherein the process control quantity is controlled manually, and wherein the output device outputs an optimum value of the process control quantity determined from a corresponding characteristic function, enabling an operator to change a desired value of the process control quantity via the input device.

10. The device of claim 1, wherein the control device is connected with a data network providing a data service and operates as a terminal (client) for the data service, wherein the data service is selected from a group consisting of Web server services, XML server services, FTP server services, SQL server services, e-mail services, application server services, J2EE services, file server services, WebDAV, SMB, NFS and AFP server services.

11. The device of claim 10, wherein the data service provides essentially in real time at least one of a process control, measurement, monitoring and regulating quantity, a product cycle duration, product costs, product quality, raw material or energy usage per product cycle, expected raw material requirements, expected production duration or expected production costs for a predetermined quantity of a predetermined product, a product error probability, a product error rate, a number of product cycles until service is required, calibration or exchange of parts of the device, maintenance and repair costs, and production startup time and costs.

12. The device of claim 1, wherein the displayed value of process monitoring quantity is selected from the group consisting of an actual value, a desired value, an average value, an integrated value since startup of the device, a historical value, and a trend.

13. A device for processing a plastic material, comprising:
a material supply device which supplies the plastic material as raw material;
a plasticizing device which plasticizes or homogenizes, or both, the supplied raw material;
a molding device which forms the plasticized or homogenized raw material into a product that is removed from the molding device after a predetermined cool-down or hardening time,
a control device which controls processing via process parameters and which is connected for data transmission with an input device receiving a value of a process input quantity or a process control quantity, or both,
a processor which is connected for data transmission with the control device and determines from a predetermined process control quantity or a predetermined process input quantity a predetermined process monitoring quantity,
a storage device connected to the processor and storing at least one of a lower and an upper experience limit value for a process monitoring quantity or a process regulating quantity, and a dependence of the process monitoring or regulating quantity from the process control quantity as a characteristic function in form of a predetermined number of discrete experience value tuples, and
an output device connected to the control device outputting and displaying in form of a characteristic curve field a value of a process monitoring quantity.

14. A device for processing a plastic material having an operating mode minimizing product costs, comprising:
a material supply device which supplies the plastic material as raw material;
a plasticizing device which plasticizes or homogenizes, or both, the supplied raw material;
a molding device which forms the plasticized or homogenized raw material into a product that is removed from the molding device after a predetermined cool-down or hardening time,
a control device which controls processing via process parameters and which is connected for data transmission with an input device receiving a value of a process input quantity or a process control quantity, or both,
a processor which is connected for data transmission with the control device and regulates, based on the received value of the process input quantity or the process control quantity, product costs such that the product costs assume a minimum value, wherein the processor determines a process monitoring quantity representing product quality and prevents the product quality from falling below a lower experience or operator-defined limit value, and
an output device connected to the control device outputting and displaying in form of a characteristic curve field a value of a process monitoring quantity.

15. A device for processing a plastic material and having an operating mode minimizing energy usage per product cycle, comprising:
a material supply device which supplies the plastic material as raw material;
a plasticizing device which plasticizes or homogenizes, or both, the supplied raw material;
a molding device which forms the plasticized or homogenized raw material into a product that is removed from the molding device after a predetermined cool-down or hardening time,
a control device which controls processing via process parameters and which is connected for data transmission with an input device receiving a value of a process input quantity or a process control quantity, or both,
a processor which is connected for data transmission with the control device and regulates, based on the received value of the process input quantity or the process control quantity, energy usage per product cycle such that the energy usage per product cycle assumes a minimum value, wherein the processor determines a process monitoring quantity representing product quality and prevents the product quality from falling below a lower experience or operator-defined limit value, and an output device connected to the control device outputting and displaying in form of a characteristic curve field a value of a process monitoring quantity.

16. A device for processing a plastic material, comprising:
a material supply device which supplies the plastic material as raw material;
a plasticizing device which plasticizes or homogenizes, or both, the supplied raw material;
a molding device which forms the plasticized or homogenized raw material into a product that is removed from the molding device after a predetermined cool-down or hardening time,
a control device which controls processing via process parameters and which is connected for data transmission with an input device receiving a value of a process input quantity or a process control quantity, or both,
a processor which is connected for data transmission with the control device and regulates at least two process monitoring quantities according to a predetermined combination of control criteria,
a closed-loop controller connected for data transmission with the control device, with the closed-loop controller regulating a process regulating quantity according to a presettable control criterion or a desired value received from the input device, and
an output device connected to the control device outputting and displaying in form of a characteristic curve field a value of a process monitoring quantity,
wherein the processor determines an optimum value of a process control quantity for an optimum product cycle, for which simultaneously product cycle duration, material and energy usage per product cycle are a minimum.

17. The device of claim 14, further comprising a closed-loop controller connected for data transmission with the control device, with the closed-loop controller regulating a process regulating quantity according to a presettable control criterion or a desired value received from the input device.

18. The device of claim 14, further comprising a storage device connected to the processor and storing at least one of a lower and an upper experience limit value for a process monitoring quantity, or a process regulating quantity.

19. The device of claim 17, wherein the processor regulates the process regulating quantity such that an actual values of the process monitoring quantity does not fall below or does not exceed at least one lower or upper experience limit value or a presettable lower or upper user limit value.

20. The device of claim 19, wherein if the actual value of the process monitoring quantity exceeds or falls below the lower experience or operator-defined limit value, the control device generates a warning signal or a warning message via the output device or controls the device to assume a safe state or switches the device off, or a combination thereof.

21. The device of claim 18, wherein the storage device stores a dependence of a process monitoring or regulating quantity from a process control quantity as a characteristic function in form of a predetermined number of discrete experience value tuples.

22. The device of claim 14, wherein the control device sets a desired value of a process control quantity, which is regulated automatically, to an optimum value determined from a corresponding characteristic function.

23. The device of claim 15, further comprising a closed-loop controller connected for data transmission with the control device, with the closed-loop controller regulating a process regulating quantity according to a presettable control criterion or a desired value received from the input device.

24. The device of claim 15, further comprising a storage device connected to the processor and storing at least one of a lower and an upper experience limit value for a process monitoring quantity, or a process regulating quantity.

25. The device of claim 23, wherein the processor regulates the process regulating quantity such that an actual values of the process monitoring quantity does not fall below or does not exceed the at least one lower or upper experience limit value or a presettable lower and/or upper user limit value.

26. The device of claim 25, wherein if the actual value of the process monitoring quantity exceeds or falls below the experience or user limit value, the control device generates a warning signal or a warning message via the output device or controls the device to assume a safe state or switches the device off, or a combination thereof.

27. The device of claim 14, wherein the process control quantity or the process input quantity further represents a maximum output rate and a process regulating quantity representing a product cycle duration is regulated to a minimum value, and the process monitoring quantity representing a product quality is monitored and prevented from falling below a lower experience or operator-defined limit value.

28. The device of claim 24, wherein the storage device stores a dependence of a process monitoring or regulating quantity from a process control quantity as a characteristic function in form of a predetermined number of discrete experience value tuples.

29. The device of claim 15, wherein the control device sets a desired value of a process control quantity, which is regulated automatically, to an optimum value determined from a corresponding characteristic function.

* * * * *